United States Patent [19]

Adams et al.

[11] Patent Number: 5,384,841
[45] Date of Patent: Jan. 24, 1995

[54] AUTOMATIC CALL DISTRIBUTION NETWORK WITH CALL OVERLOAD SYSTEM AND METHOD

[75] Inventors: David J. Adams, Warrenville; Wayne L. Harbuziuk; Christopher G. Culp, both of Wheaton, all of Ill.

[73] Assignee: Rockwell International Corporation, El Segundo, Calif.

[21] Appl. No.: 144,170

[22] Filed: Oct. 27, 1993

[51] Int. Cl.⁶ .............................................. H04M 3/54
[52] U.S. Cl. .................................... 379/266; 379/127; 379/221; 379/309
[58] Field of Search ............... 379/265, 266, 225, 220, 379/221, 210, 211, 212, 207, 93, 94, 95, 45, 309

[56] References Cited

U.S. PATENT DOCUMENTS

| | | | |
|---|---|---|---|
| 4,400,587 | 8/1983 | Taylor et al. | 379/266 X |
| 4,620,066 | 10/1986 | Bushnell et al. | 379/266 X |
| 4,942,602 | 7/1990 | Baker, Jr. et al. | 379/225 X |
| 5,164,983 | 11/1992 | Brown et al. | 379/112 X |
| 5,206,903 | 4/1993 | Kohler et al. | 379/309 |
| 5,253,288 | 10/1993 | Frey et al. | 379/265 X |
| 5,274,700 | 12/1993 | Gechter et al. | 379/211 X |
| 5,291,552 | 3/1994 | Kerrigan et al. | 379/266 |

Primary Examiner—James L. Dwyer
Assistant Examiner—Daniel S. Hunter
Attorney, Agent, or Firm—C. B. Patti; H. F. Hamann

[57] ABSTRACT

An automatic call distribution network (10) with an originating automatic call distributor (ACD) (12A) which transfers a received call to a destination ACD (12B) through an external telephonic network (24), a call overflow system (32) with a central processing unit (16A) at the originating ACD (12A) to compile data relating to an overflow call to be transmitted through the external telephonic network (24) to the destination ACD (12B) of at least one of the types of information of: identification of a selected gate (26B) of the destination ACD (12B) to which the overflow call is to be routed, identification of the originating ACD (12A), a time information relating to a time the overflow call was in a queue at the originating ACD (12A), an ANI number representation of a telephone number of the call received at the originating ACD (12A) and a priority level of the overflow call, the central processing unit (16A) at the originating ACD (12A) sending the compiled data to the destination ACD (12B) to route the call at the destination ACD (12B).

18 Claims, 3 Drawing Sheets

Fig.2

| BITS OCTET | 8 | 7 | 6 | 5 | 4 | 3 | 2 | 1 | |
|---|---|---|---|---|---|---|---|---|---|
| 1 | colspan=8 | USER-TO-USER IDENTIFIER ELEMENT | | | | | | | 36 |
| 2 | colspan=8 | LENGTH OF INFORMATION ELEMENT | | | | | | | 38 |
| 3 | colspan=8 | ISDN OVERFLOW IDENTIFIER | | | | | | | 40 |
| 4 | colspan=8 | GATE/APPLICATION NUMBER | | | | | | | 42 |
| 5 | colspan=8 | DELAY IN QUEUE AT ORIGINATING SWITCH (LEAST SIGNIFICANT BYTE) | | | | | | | 44 |
| 6 | colspan=8 | DELAY IN QUEUE AT ORIGINATING SWITCH (MOST SIGNIFICANT BYTE) | | | | | | | 44 |
| 7 | colspan=4 | DNIS BCD DIGIT 1 | | | | colspan=4 | DNIS BCD DIGIT 2 | | | | 46 |
| 8 | colspan=4 | DNIS BCD DIGIT 3 | | | | colspan=4 | DNIS BCD DIGIT 4 | | | | 46 |
| 9 | colspan=8 | NUMBER OF ANI DIGITS | | | | | | | 48 |
| 9A | colspan=4 | ANI BCD DIGIT 1 | | | | colspan=4 | ANI BCD DIGIT 2 | | | | 50 |
| 9B | colspan=4 | ANI BCD DIGIT 3 | | | | colspan=4 | ANI BCD DIGIT 4 | | | | 50 |
| 9C | colspan=4 | ANI BCD DIGIT 5 | | | | colspan=4 | ANI BCD DIGIT 6 | | | | 50 |
| 9D | colspan=4 | ANI BCD DIGIT 7 | | | | colspan=4 | ANI BCD DIGIT 8 | | | | 50 |
| 9E | colspan=4 | ANI BCD DIGIT 9 | | | | colspan=4 | ANI BCD DIGIT 10 | | | | 50 |
| 10 | colspan=8 | ORIGINATING ACD SITE ID | | | | | | | 52 |
| 11 | colspan=8 | | | | | | | | |
| 12 | colspan=8 | CALL PRIORITY LEVEL | | | | | | | 56 |
| 13 | colspan=8 | RESERVED FIELDS | | | | | | | |
| 14 | colspan=8 | | | | | | | | |
| 15 | colspan=8 | | | | | | | | |

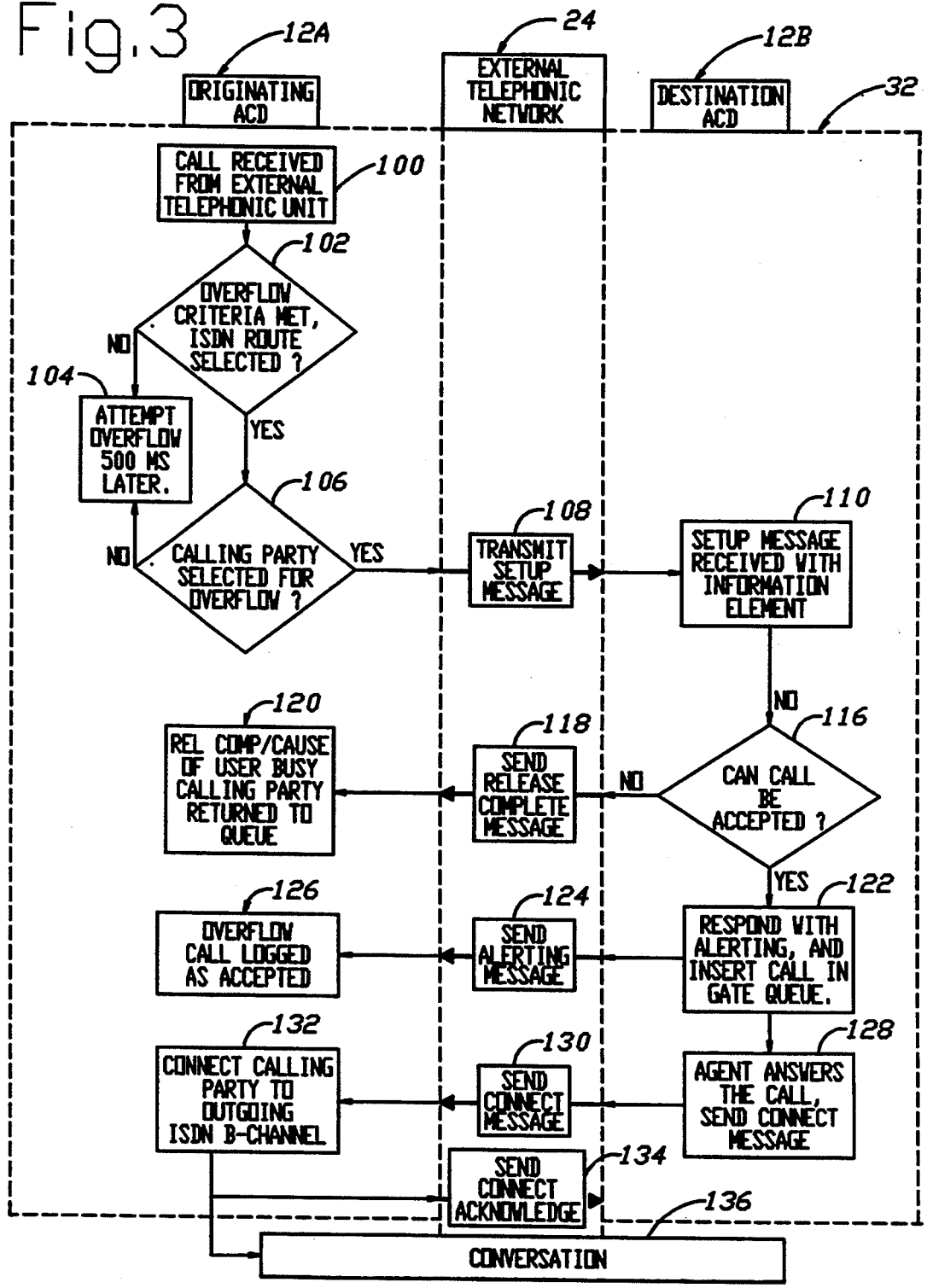

AUTOMATIC CALL DISTRIBUTION NETWORK WITH CALL OVERLOAD SYSTEM AND METHOD

BACKGROUND OF THE INVENTION

1. Field of the Invention

This invention relates generally to the field of automatic telephone call distribution networks and, more particularly, to such call distribution networks in which telephonic calls are sent from one automatic call distributor to another automatic call distributor through a regular public external telephonic network.

2. Description of the Related Art Including Information Disclosed Under 37 C.F.R. Section 1.97–1.99

Automatic call distributors employing a multiport switch controlled by a central processing unit for selectively interconnecting a plurality of interior telephonic units with external telephonic units received at the multiport switch through an external telephonic network are well known. Examples of such call distributors are shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991, U.S. Pat. No. 5,268,903; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

It is also known to send an external telephonic call received at an automatic call distributor to another automatic call distributor in an automatic call distribution network. Examples of such automatic call distribution networks are shown in U.S. patent application Ser. No. 07/960,995 of Blaha entitled "Automatic Call Distributor With Intersubnetwork Customer Information Transfer System and Method" filed Oct. 14, 1992.

In these known systems, a telephonic call made from an external telephonic unit of a regular public telephone network to which the ACD is connected, typically from a customer, is carried through the regular, public external telephonic network to one of the plurality of automatic call distributors (ACDs) in the private automatic call distribution network. Once the call is received, the automatic call distributor logically determines how the call is to be routed. The call is often directed to an agent associated with a gate at the originating ACD to service the call. However, it is desirable in an ACD network having two or more call distributors to route the telephonic call traffic as evenly as possible throughout the network. Therefore, in many situations, a call must be transferred or overflowed to an agent at another ACD in the private automatic call distribution network. The agent receiving the original call may not be able to properly service the customer at the external telephonic unit, thus, the call must be transferred to another agent located at another destination ACD. Moreover, the telephonic traffic flow often exceeds the call capacity of a particular gate at the originating ACD thereby requiring a call to be overflowed to another trunk group or gate at another ACD in the network.

The automatic call distributors in such known systems are placed at various distant locations throughout the network. A call transferred between automatic call distributors is done through dedicated trunks interconnecting the ACDs in the network. Disadvantageously, excessive costs are associated with installing, maintaining and operating these dedicated trunk lines between the ACDs in private automatic call distribution network.

In such known automatic call distribution networks, the transmission of information between automatic call distributor nodes over costly dedicated intertandem trunks or tie lines requires approximately a 1.0 to 1.5 second set-up signalling and verification time between the ACD sending the overflow call and the ACD receiving the overflow call. Thus, there is as much as a two to three second call set up delay when overflowing a call from one ACD to another ACD over dedicated intertandem trunks in known ACD networks. In automatic call distribution networks servicing 1-800 or toll free calls, the user or owner of the network pays for the cost of each call received at a call distributor. Disadvantageously, in such known call distribution networks receiving thousands of calls per hour, a two or three second set-up delay per call costs the user of the network substantial amounts each year.

Furthermore, in such known ACD networks information is sent between ACDs across tie lines as dual tone multiple frequency (DTMF) tones. These tones are transmitted one at a time across tie lines and require a 160 millisecond transmission time for each tone. Unfortunately, when twenty or thirty digits of information transmitted as tones are desired to be sent with a call, the transmission time is too long to efficiently transfer a call between ACDs. Thus, only a few digits of information relating to the overflow call are transmitted across tie lines thereby limiting the routing and application features for the call at the receiving ACD. Therefore, these known ACD networks provide the disadvantage of long call set up and transfer times and further limit the amount of digital information which can be sent with a call.

It is known to transfer a call from one automatic call distributor to another automatic call distributor through the a regular public external telephonic network. The Look-Ahead Interflow feature developed by American Telephone and Telegraph Company establishes a connection via the public external telephonic network from one ACD to a second ACD and transfers a received call at the one ACD to the second ACD. However, the Look-Ahead Interflow feature is limited in the amount and type of data information which is carried with the telephonic call to the second ACD. Look-Ahead Interflow does not provide data to identify which gate the transferred call is to be routed at the receiving ACD. Disadvantageously, the receiving ACD must perform several time consuming processes in attempting to properly route the call. Moreover, since many variable conditions must be met at the receiving ACD to properly route the call, by not having information identifying the gate at which the call is to be routed increases the possibility of a call being routed to a wrong location. Furthermore, the Look-Ahead Interflow does not identify the original sending ACD which transfers the call to the receiving ACD. Thus, there is nothing to prevent the inefficiency of calls being transferred or overflowed from the destination ACD back to the originating ACD which is not able to efficiently route the call.

The Look-Ahead Interflow feature also fails to provide information relating to the number of times a call has been overflowed. Disadvantageously, calls can be continually transferred between numerous ACDs prior to being routed to a gate and serviced by an agent thereby increasing the amount of time to route and service an incoming call to the network.

Furthermore, the Look-Ahead Interflow feature fails to supply the delay time of a call in queue at the originating ACD when transferring the call to another ACD. Consequently, the total delay time for overflow calls cannot be ascertained. In such case, it is not possible to accurately evaluate the overall performance of an automatic call distribution network. For example, a call may have a delay time of fifteen seconds at an originating ACD and an additional five second delay after being overflowed to another or destination ACD. In such known networks, the system administrator at the destination ACD is only aware of the five second delay time and not the twenty second total delay time, and thus calls at the destination ACD are not able to be efficiently routed.

Additionally, the Look-Ahead Interflow feature disadvantageously fails to send Automatic Number Identification (ANI) information with an overflowed call and thus limits the information available for the receiving or destination ACD to effectively route the overflowed call and to trigger various optional features of the system such as announcements, screen displays, etc.

Therefore, these known systems are limited by the limited amount of information transferred with an overflow call, thereby reducing the amount of routing and application features available in such automatic call distribution network with overflow capability.

SUMMARY OF THE INVENTION

It is therefore a principal object of the present invention to provide an automatic call distribution network with a call overflow system in which the disadvantages of transferring a telephonic call from one automatic call distributor to another automatic call distributor in known call distribution networks are overcome.

This object is achieved by providing in an automatic call distribution network having means for transferring a call received at an originating ACD to a destination ACD through an external telephonic network with a call overflow system, comprising means at the originating ACD to compile data related to an overflow call to be transmitted through the external telephonic network to the destination ACD including at least one of the types of information of (a) identification of a selected gate of the destination ACD to which the call is to be routed (b) identification of the originating ACD (c) a time information relating to a time the overflow call was in a queue at the originating ACD (d) an ANI number representation of a telephone number of the call received at the originating ACD and (e) a priority level of the overflow call and means at the originating ACD for sending the compiled data to the destination ACD to route the overflow call at the destination ACD.

This object is also achieved by providing in an automatic call distribution network having an originating ACD and a destination ACD both interrelated through an external telephonic network with a method of transferring an overflow call comprising the steps of (1) compiling data at the originating ACD relating to an overflow call to be transferred through the external telephonic network to the destination ACD including at least one of the types of information of (a) identification of a selected gate of the destination ACD to which the call is to be routed (b) identification of the originating ACD (c) a time information relating to a time the overflow call was in a queue at the originating ACD (d) an ANI number representation of the telephone number of the call received at the originating ACD and (e) a priority level of the overflow call and (2) sending the compiled data from the originating to the destination ACD to route the overflow call at the destination ACD.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 2 shows the format of the preferred embodiment of the information element data packet of the present invention; and FIG. 3 is a flow chart of the preferred steps of transferring an overflow call from an originating ACD to a destination ACD through the external telephonic network in the automatic call distribution network of FIG. 1.

DESCRIPTION OF THE PREFERRED EMBODIMENT

Figure 1:
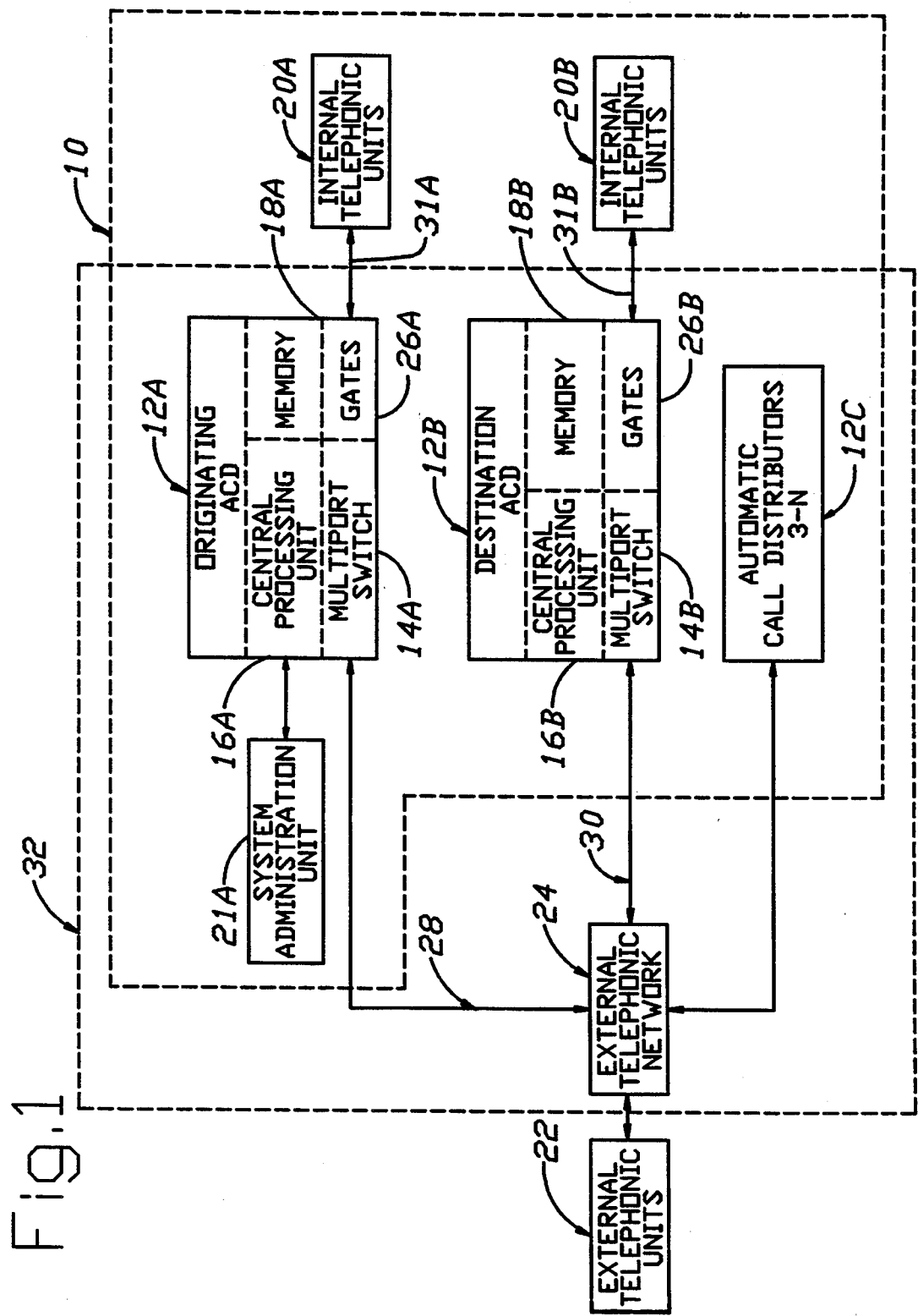
FIG. 1 is a functional block diagram of the preferred embodiment of the automatic call distribution network of the present invention as interconnected with a known external telephonic network of external telephonic units.

Referring to FIG. 1, automatic call distribution network 10 is shown having automatic call distributors (ACDs) 12A, 12B and 12C. Originating automatic call distributor 12A has multiport switch 14A controlled by a central processing unit 16A in conjunction with main memory 18A for distributing telephonic calls to internal telephonic units 20A received from external telephonic units 22 through external telephonic network 24. The originating automatic call distributor 12A receiving a call from a customer at an external telephonic unit 22 routes the call to a gate 26A at which one or more agents stationed at internal telephonic units 20A service the call. To distribute calls received from the external telephonic units 22 as evenly and efficiently as possible, the originating automatic call distributor 12A transfers or overflows received calls through the public external telephonic network 24 upon meeting a specified overflow criteria to a selected destination automatic call distributor 12B in the ACD network 10.

The destination ACD 12B receives the overflow call sent from the originating ACD 12A via the public network 24 at multiport switch 14B controlled by central processing unit 16B in conjunction with main memory 18B, and routes the call to a gate 26B representing one or more internal telephonic units 20B, if a predetermined overflow criteria (i.e. call is idle for predetermined period of time, all internal telephonic units for a particular gate are busy, etc.) are met. Telephonic calls received at the originating ACD 12A and the destination ACD 12B are routed to corresponding internal telephonic units 20A and 29B over lines 31A and 31B, respectively. Agents stationed at the internal telephonic units 20B of the destination automatic call distributor 12B service the received call. If the transferred call is not accepted at the destination ACD 12B, then the originating ACD 12A alternatively transfers the call to another ACD 12C specified by a system administrator at a system administration unit 21A for servicing of the call. Preferably, the telephonic call is prevented from being transferred back to the originating ACD 12A when being overflowed from the destination ACD 12B. Telephonic calls are transferred through a regular public external telephonic network 24 in utilizing a virtual private network service type. Generally, while the telephonic call overflow system of the present invention can be implemented in automatic call distribution networks having a plurality of automatic call distributors, it is preferably employed in an automatic call distribution network having call distributors of the type shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991, U.S. Pat. No. 5,268,903; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986 and U.S. patent application Ser. No. 07/960,995 of Blaha entitled "Automatic Call Distributor With Intersubnetwork Customer Information Transfer System and Method" filed Oct. 14, 1992.

The central processing unit 16A of the originating ACD 12A compiles data in an information element data packet 34, FIG. 2, and sends this data along with the overflow call to the destination ACD 12B, FIG. 1. The data contained in the information element 34, FIG. 2, enables the destination ACD 12B, FIG. 1, to efficiently route the overflow call and provides information to trigger the central processing unit 12B to perform various features at the destination ACD 12B such as announcements of agents at internal telephonic units 20B, announcements to customers calling from external telephonic units 22 screen displays of data at the internal telephonic units, prioritization of call routing and network call handling reports. The data carried with the overflow call is shown in greater detail in FIG. 2. Preferably, the information element data packet 34, FIG. 2, contains the following type of information: (1) an optional gate number for identification of a selected gate 26B of the destination ACD 12B to which the call is to be routed, (2) the delay time of the call at the originating ACD 12A prior to the call transfer or overflow attempt, (3) Dialed Number Identification Service (DNIS) digits, (4) Automatic Number Identification (ANI) digits, (5) identification data of the originating ACD and (6) priority data of the overflow call.

Preferably, the transferring of an overflow call with the data in the information element on the present invention is used in an Integrated Services Digital Network (ISDN) environment. ISDN is a worldwide telecommunication service that uses digital transmission and switching technology to support voice and digital data transmission. The international standards for ISDN based telephonic equipment originated by the Comitè Consultatif Internationale de Tèlègraphique et Tèlègraphique (International Telegraph and Telephone Consultive Committee or CCITT. The automatic call distributors 12A, 12B and 12C of the present invention use standard ISDN Primary Rate Interface (PRI) protocol. In North America, the PRI provides 23 B+D signaling at 1.544 megabits per second. The "B" stands for Bearer channel which carries 64,000 bits per second of Pulse code modulation (PCM) digital voice or data. The "D" refers to the Data channel which is used to carry control signals and call information data in a packet switched mode. In the PRI, the "D" channel runs at 64,000 bits per second and provides the signaling information for each of the twenty-three bearer channels.

ISDN software and hardware are informally referenced to and divided into three logical layers. Layer one is the physical layer and provides the standards to physically interconnect telephonic equipment of different ISDN vendors. Layer two is the data layer and provides a software interface into layer one. Layer two handles the transmission of data between telephone equipment and a telephonic switching system and management of all message error detection and correction. Layer three is the application layer in which call control messages are generated and interpreted.

Referring to FIG. 2, the format of the preferred information element data packet 34 is shown with the call information carried on the "D" channel in response to the sending or overflowing of a telephonic call from the originating ACD 12A, FIG. 1, to the destination ACD 12B. The information element 34 is a variable length byte data packet having eight bits per byte. The information element data packet 34 is included as part of a SETUP message when an overflow call is initiated between the originating switch 14A and the destination switch 14B. The information element contains information which the destination ACD 12B uses to route the call to determine acceptance of the call and to trigger the sending of data to internal telephonic units 12B servicing the overflow call.

Information identifying the information element data packet is inserted in byte one 36, FIG. 2. The information in byte one 36 identifies to the central processing unit 16B, FIG. 1, of the destination ACD 12B that the received data packet is an ISDN user-to-user information element 34. The ISDN user-to-user identifier information 36, FIG. 2, further informs the public external telephonic network 24, FIG. 1, that the data contained in the information element 34 concerns the private ACD network 10 and the public external telephonic network sends the information element data packet to the destination ACD.

Byte two 38 contains the length of the information element data packet 34. The ISDN overflow identifier is in byte three 40. Byte four 42 provides the gate application number. The gate application data in byte 42 is the identification data of a selected gate 26B, FIG. 1, of the destination ACD 12B to which the overflow call is to be routed. A supervisor or system administrator enters a specified gate number at a system administration unit terminal 21A to provide the central processing unit 16A at the originating ACD 12A the selected gate 26B at the destination ACD 12B to which an overflowed call from a gate 26A of the originating ACD is to be routed. This allows the system administrator at the originating ACD 12A to determine the routing of an overflow call received at a destination ACD 12B. In response to the receipt of the gate application number in byte four 42 of the information element 34, FIG. 2, the central processing unit 16B of the destination ACD 12B connects the overflow call to a line 31B associated with the specified gate. The overflow call is thereby serviced at an internal telephonic unit 20B associated with the identified gate 20B.

Alternatively, if no gate number 42 is specified at the originating ACD 12A then the destination ACD 12B routes the received overflow call as it normally routes the incoming ISDN calls from the external telephonic network 24. The routing of an overflow call not containing information relating to the identification of a selected gate 26B in byte four 42 of the information element 34 is based on DNIS digits, ANI digits or a default gate at the destination ACD. The system administration unit 21A selectively allows or prevents the sending of data identifying a selected gate 26B for the routing of a call received at the destination ACD 12B from the originating ACD. Thus, the present invention allows for flexibility in the routing of overflow calls in that either the originating ACD 12A or the destination ACD 12B selectively dictate how an overflow call is routed at the destination ACD.

Bytes five and six 44, FIG. 2, contain the delay time of the call at the originating ACD 12A. The central processing unit 16A of the originating ACD 12A receiving the call made from an external telephonic unit 22 maintains a record of the amount of time in which a received call is in queue waiting to be answered at the originating ACD. The central processing unit 16A compares the time of receipt of a call received from an external telephonic unit 22 with the time in which the call is overflowed to determine the delay time in queue for the call. The delay time of the calling party from the external telephonic unit is carried in the information element data packet 34 with an overflow call transferred from the originating ACD 12A to the destination ACD 12B. The delay time information received at the destination ACD 12B is used to evaluate the call handling performance throughout the ACD network 10. The central processing unit 16B at the destination ACD 12B determines a total delay time of the overflow call by adding the delay time data received in the information element 34, FIG. 2, with the delay time the call is in queue at the destination ACD. Preferably, the central processing unit 16B at the destination ACD 12B routes calls having a longer delay time in queue to an internal telephonic unit 20B before another call having a shorter delay time.

Various types of telephonic calls, such as 1-900 and 1-800 or toll-free calls, received from the external telephonic units 22, FIG. 1, frequently are assigned call type identification signals which are transferred with the call to the originating ACD 12A originally receiving the call. These call type identification signals preferably are Dialed Number Identification Service (DNIS) digits or Automatic Number Identification (ANI) digits which are associated with different types of calls. Specifically, it is common practice for a long distance telephone carrier company of the public external telephonic network 24 to assign DNIS digits or ANI digits associated with different types of telephonic calls. Examples of such long distance carrier companies are American Telephone and Telegraph Co., MCI, Sprint, etc. The DNIS digits or ANI digits, or both, are carried concurrently with the telephonic call from the external telephonic network 24 to the originating ACD 12A.

The DNIS digits or ANI digits, or both, are further carried with the telephonic call which is overflowed from the originating ACD 12A originally receiving the call to the destination ACD 12B receiving the overflow call.

The DNIS digits of the originating call received from an external telephonic unit 22, FIG. 1, are located in bytes seven and eight 46, FIG. 2. Byte nine 48 of the information element 34 contains the data for the total number of ANI digits associated with the particular type of overflow call being sent to the destination ACD 12B. Bytes nine A through nine E 50 contain the ANI digits which represent the telephone number of the external telephonic unit 22 generating a call received at the originating ACD 12A and transferred as an overflow call to the destination ACD 12B. The ANI digits 50 are carried in the information element data packet 34 with the overflow call from the originating switch 14A and received at the destination switch 14B. The central processing unit 16B at the destination ACD 12B selectively uses the digital ANI information 50 for routing of the received overflow call to a designated gate 26B and in turn, to an internal telephonic unit 20B to service the call. The ANI information received at the destination ACD 12B also triggers the central processing unit 16B to send information and execute various applications at the internal telephonic units 20B. These applications include but are not limited to the playing of personal announcements regarding the type of incoming call to agents stationed at the internal telephonic units, displaying data regarding the call at agent terminals at the internal telephonic units and playing recorded messages to customers calling form the external telephonic unit.

Information regarding the identification of the site of the originating ACD 12A, FIG. 1, is located in byte ten 52, FIG. 2 of the information element data packet 34. The data identifying the originating ACD 12A in byte ten 52 informs the central processing unit 16B of the destination ACD 12B as to the location of the automatic call distributor in the network 10 which transferred the overflow call. In response to receipt of the originating ACD site identification data 52, the central processing unit 16B of the destination ACD determines the origin of the received overflow call. The originating ACD site information 52 is used by the central processing unit 16B of the destination ACD 12B to track data relating to the call received at the originating ACD 12A. The information identifying the originating ACD is particularly useful in an ACD Network 10 in which data is accessed from a common data base by the originating ACD 12A and the destination ACD 12B.

Byte twelve 56 contains information regarding the priority of the overflow call. Calls from the external telephonic units 22 of the external network 24 received at the originating ACD 12A are categorized into different priority levels. The system administrator at the system administration unit 21A inserts into the memory 18A of the originating ACD 12A the various priority levels for various calls received at the switch 14A. Preferably, calls assigned to higher priority levels are routed to internal telephonic units sooner than calls having a lower priority level. The priority level assigned to a particular call is inserted into byte twelve 56, FIG. 2, of the information element 34 in response to the call being overflowed to a destination ACD 12B. The assigned priority level 56 of the overflow call informs the destination ACD 12B of the categorized priority level of the call. The central processing unit 16B places the received call in the appropriate level within a queue to properly service the overflow call at the destination ACD 12B. The call information in the data packet 34 allows for flexibility in routing and efficient management of the call distribution in the ACD network 10.

Referring again to FIG. 1, the implementation of ISDN standards ensures the sending of telephonic calls with associated call information between multiple ACDs 12A, 12B and 12C using PRI D-channels and B-channels through the public external telephonic network 24. This provides for a call overflow system 32 without the cost of dedicated D-channels and B-channels over tie lines between the call distributors. The use of ISDN messages to overflow a call allows specific information associated with the call to be sent from the originating ACD 12A to the destination ACD 12B.

A telephonic call is received at the switch 14A of the originating ACD 12A from an external telephonic unit 22 through the public network 24. The central processing unit 16A determines which gate 26A the call is to be routed. The memory 18A of the central processing unit 16A contains the predetermined criteria used for determining the overflow of a call to a destination ACD 12B. In response to the predetermined overflow criteria being met for a gate 26A at the originating ACD 12A an ISDN route is used to select an idle ISDN B-channel utilizing a T-1 span line 28 to carry the call through the public external telephonic network 24. The central processing unit 16A of the originating ACD 12A allocates an ISDN B-channel on the T-1 span line 28 for the transferring of the overflow call to the destination ACD 12B. The call received at the originating multiport switch 14A is selected for overflow to the destination multiport switch 14B of the destination ACD 12B.

Once an ISDN B-channel is selected for overflow and the received telephonic call at the originating ACD 12A awaiting answer by a gate server or internal telephonic unit 20A is selected for overflow service, the originating ACD sends a SETUP message over a D-channel across T-1 span line 28 to the public external telephonic network 24 and through trunk line T-1 span line 30 to a specified destination ACD 12B. A gate server or internal telephonic unit 20A is a device capable of answering a call directed to an associated gate 26A. The gate server devices are assigned to a gate 26A through primary, secondary or tertiary assignments. Preferably, gate servers 20A, 20B include but are not limited to: agent telephonic units in which agents service received calls, voice response units, automatic response units and gate private branch exchanges. The SETUP message is an ISDN layer three message used to indicate call establishment. The SETUP message contains the information element data packet 34, FIG. 2, providing the specific call routing and feature triggering information associated with the overflow call to the destination ACD 12B, FIG. 1.

When the destination ACD 12B receives the SETUP message, the receipt of the accompanying information element data packet 34, FIG. 2, serves as an indication that the call received is a call transferred or overflowed from another ACD in the ACD network 10. In response to the receipt of the data in the information element 34, the central processing unit 14B of the destination ACD 12B determines how to route the received overflow call. Preferably, the order of precedence for routing the call at the destination ACD 12B is as follows:

1. If a gate number 42, FIG. 2, is carried with the information element data packet 34, the destination ACD 12B, FIG. 1, routes the call to the identified gate 26B.

2. If a gate number 42, FIG. 2, is not supplied in the information element 34, then the destination ACD 12B, FIG. 1, attempts to route the call based upon the DNIS 46 or ANI numbers 50 in the information element data packet 34. If neither DNIS nor ANI are supplied, then default routing is performed. If the DNIS number 46 is invalid, DNIS default gate routing, if implemented, is performed. If the DNIS number 46 is invalid and DNIS default gate routing is not implemented, the overflow call is rejected.

3. If a gate number 42 is not supplied to the information element 34 and no DNIS number 46 appears in the information element data packet, but an ANI number 50 does appear in the information element, then the call is routed based on its associated ANI number. The ANI and DNIS numbers contained in the information element 34 are used for other features requiring ANI or DNIS information.

If the destination ACD 12B, FIG. 1, accepts the call, an ALERTing message is sent to the originating ACD 12A. The originating ACD 12A logs an Overflow Outcall Accepted in the Gate Overflow and Trunk information-Group records in its associated memory 18A.

When a gate server or internal telephonic unit 20B at the destination ACD 12B answers the call, a CONNect message is propagated to the originating ACD 12A. The gate queue entry is deleted and connected to the outgoing B-channel selected for the overflow. The caller at the external telephonic unit 22 and the gate server 20B have a two-way connection, and the overflow attempt is successfully completed. An overflow out-call handled is logged in the gate overflow record at the originating ACD memory 18A, while an overflow in-call handled is logged in the trunk information-group and gate records at the destination ACD memory 18B. An ISDN overflow in-call handled and delay time to overflow for handled calls are also logged in the destination ACD memory 18B.

While the advantages of the invention are preferably obtained in the automatic call distribution network 10 described above with reference to FIG. 1, the method can be practiced with any other automatic call distribution networks having means for transferring a call received at an originating automatic call distributor (ACD) to a destination automatic call distributor through an external telephonic network. In any event, the preferred method of practicing the invention comprises the steps of (1) compiling data at the originating ACD relating to an overflow call through the external telephonic network to the destination ACD including at least one of the types of information of (a) identification of a selected gate of the destination ACD to which the call is to be routed (b) identification of the originating ACD (c) a time relating to a time the overflow call was in a queue at the originating ACD (d) an ANI number representation of a telephone number of the call received at the originating ACD and (e) a priority level of the overflow call; and (2) sending the compiled data from the originating to the destination ACD to route the overflow call at the destination ACD.

Referring to FIG. 3, the method of overflowing a call from an originating ACD 12A to a destination ACD 12B via the public external telephonic network 24 is done in the call overflow system 32 at step 100 by the originating ACD receiving a telephonic call from an external telephonic unit 22, FIG. 1, through the external telephonic network. In step 102, FIG. 3, the central processing unit 16A, FIG. 1, for the originating ACD 12A receiving the call from the external telephonic unit 22 determines if the overflow criteria have been met for a gate 26A at the originating ACD. While determining if the overflow criteria have been met, the originating ACD 12A also selects an ISDN route on a trunk line 28 and an attempt is made to allocate an ISDN B-channel for the overflow call. If the overflow criteria is not met, in step 104, FIG. 3, the central processing unit 16B attempts another overflow after 500 milliseconds. If the overflow criteria are met, then in step 106 the originating ACD 12A selects a telephonic call in the queue for the specified gate 26A, FIG. 1, for transfer to the destination ACD 12B. If a telephonic call is not selected for overflow to the multiport switch 14B of the destination ACD 12B, then the originating ACD 12A repeatedly attempts to overflow a call every 500 milliseconds in step 104, FIG. 3. If the telephonic call received at the originating ACD 12A is selected for overflow, then in step 108 the originating ACD transmits a SETUP message containing the information element data packet 34, FIG. 2, to the destination ACD 12B via the public external telephonic network 24. The telephonic call is selected for overflow to a destination ACD 12B based on the criteria set for establishing overflow calls. Preferably, the criteria as based on the delay time of calls received from an external telephonic unit that is placed in a queue at the originating ACD 12A along with the number of calls currently overflowed and accepted to a destination ACD 12B.

In step 106, FIG. 3, once the originating ACD 12A, FIG. 1, selects an ISDN B-channel for the overflow of the call to the destination ACD 12B and the telephonic call awaiting answer by a gate server 20A is selected for overflow service, the originating ACD 12A sends a SETUP message in step 108 over a D-channel, through the public network 24 to a specified destination ACD 12B. The information element 34, FIG. 2, received at the destination ACD 12B, FIG. 1, as part of the SETUP message serves as an indication to the destination ACD 12B that the received call is an overflow call transferred from an originating ACD 12A as opposed to a call directly connected through the public network 24 from an external telephonic unit 22, FIG. 1.

In step 110, FIG. 3, the destination ACD 12B receives the SETUP message with the information element data packet 34, FIG. 2. In step 116, the destination ACD 12B determines if a call can be accepted. The central processing unit 16B of the destination ACD 12B determines the acceptance of the overflow call based on acceptance criteria which are (1) the call time in queue, in that the maximum delay in queue is greater than a specified threshold criteria, and (2) if the number of accepted overflow calls is less than the specified call limit, then the overflow call is accepted at the destination ACD. If a call cannot be accepted, then in step 118, FIG. 3, the destination ACD 12B, FIG. 1, sends a RELease COMPlete message through the public network 24 to the originating ACD 12A. The RELease COMPlete message is an ISDN layer three message which indicates that the destination ACD 12B released the B-channel and call reference and the B-channel is available for use. In step 120, FIG. 3, the originating ACD 12A receives the RELease COMPlete message and the telephonic call is placed back in queue at the originating ACD.

If the telephonic call is accepted at the destination ACD 12B, then in step 122, the destination ACD responds by sending an ALERTing message to the originating ACD 12A in step 124 and inserts the call in the queue for the specified gate 26B at the destination ACD. The ALERTing message is an ISDN layer three message sent by the destination ACD 12B to the public network 24 and by the public network to indicate that a called user alerting has been initiated. In step 126, the overflow call to the destination ACD 12B is logged as "accepted" at the originating ACD 12A. In step 128, an agent at an internal telephonic unit 20B, FIG. 1, of the destination ACD 12B answers the overflow call and the destination ACD 12B sends a CONNect message to the originating ACD 12A. A CONNect message is an ISDN layer three message indicating the answer of a call by an ACD. The CONNect message is sent from the destination ACD 12B in step 130 through the public external telephonic network 24 to the originating ACD 12A. In step 132, the originating ACD 12A connects the telephonic call from the external telephonic unit 22, FIG. 1, to an outgoing ISDN B-channel.

In step 134, the originating ACD 12A sends a CONNect ACKnowledge message to the public external telephonic network 24 to confirm the internal telephonic unit 20B has received the connected call. A CONNect ACKnowledge message is an ISDN layer three message sent by the ACD network 10 to the external telephonic unit 22 via the public external telephonic network 24 to confirm that the internal telephonic unit 20B has received the connected call. In response to the receipt of the CONNect message, a two way voice communication path is established in step 136, FIG. 3, between the caller at the external telephonic unit 22 and the internal telephonic unit 20B at the destination ACD 12B via the originating ACD 12A and the public external telephonic network 24. While the flow chart of FIG. 3 illustrates the process of completing an overflow call with the associated information element data packet between the originating ACD and the destination ACD, the same procedural steps are implemented upon transferring an overflow call again from the originating ACD to any number of other ACDs in the automatic call distribution network.

While a detailed description of the preferred embodiment of the invention has been given, it should be appreciated that many variations can be made thereto without departing from the scope of the invention as set forth in the appended claims.

We claim:

1. In an automatic call distribution network having means for transferring a call received at a originated ACD to a destination ACD through an external telephonic network, the improvement being a call overflow system, comprising:

means at the originating ACD to compile data relating to an overflow call to be transmitted through the external telephonic network to the destination ACD including at least one of the types of information of (a) identification of a selected gate of the destination ACD to which the call is to be routed in addition to the destination ACD telephone number (b) identification of the originating ACD (c) a time information relating to a time the overflow call was in a queue at the originating ACD (d) an ANI number representation of a telephone number of the call received at the originating ACD and (e) a priority level of the overflow call; and means at the originating ACD for sending the compiled data in a SETUP message with the overflow call in an ISDN network to the destination ACD to route the overflow call at the destination ACD.

2. The automatic call distribution network of claim 1 in which all types of information (a), (b), (c), (d) and (e) are included in the data.

3. The automatic call distribution network of claim 1 including means at the originating ACD for selectively preventing the sending of data including information relating to identification of the selected gate of the destination ACD to which the overflow call is to be routed.

4. The automatic call distribution network of claim 1 in which the data is sent to a destination ACD in which includes means responsive to identification of the selected gate in the data received from the originating ACD to connect the overflow call to a line associated with said gate.

5. The automatic call distribution network of claim 1 in which the destination ACD responds to identification of the originating ACD in the data received from the originating ACD to track data relating to the call received at the originating ACD.

6. The automatic call distribution network of claim 1 in which the time information relating to the overflow call is delay time in which the overflow call was in queue at the originating ACD.

7. The automatic call distribution network of claim 6 in which the destination ACD responds to the call at the originating ACD in the data received from the originating ACD to determine a total delay time of the overflow call.

8. The automatic call distribution network of claim 1 in which the destination ACD responds to the ANI number representation in the data received from the originating ACD to send information relating to the identified type of overflow call received at the destination ACD to an internal telephonic unit at the destination ACD.

9. The automatic call distribution network of claim 1 in which the destination ACD responds to receipt of the priority level for placing the overflow call in a queue at the destination ACD in accordance with the assigned priority level of the call.

10. The automatic call distribution network of claim 1 including means at the originating ACD for transferring the overflow call to another ACD in response to the destination ACD not accepting the overflow call from the originating ACD.

11. In an automatic call distribution network having a originating ACD and a destination ACD both interrelated through an external telephonic network, improvement being a method of transferring an overflow call, comprising the steps of:

compiling data at the originating ACD relating to an overflow call to be transferred through the external telephonic network to the destination ACD including at least one of the types of information of (a) identification of a selective gate of the destination ACD to which the call is to be routed in addition to the destination ACD telephone number, (b) identification of the originating ACD, (c) a time information relating to a time the overflow call was in a queue at the originating ACD, (d) an ANI number representation of the telephone number of the call received at the originating ACD and (e) a priority level of the overflow call; and sending the compiled data in a SETUP message with the overflow call in an ISDN network from the originating to the destination ACD to route the overflow call at the destination ACD.

12. The method of claim 11 including the step of selectively preventing the sending of data including information relating to identification of the selected gate of the destination ACD to which the call is to be routed.

13. The method of claim 11 including the step of connecting the overflow call to a line associated with the selected gate at the destination ACD in response to receipt of the identification of the selected gate in the data received from the originating ACD.

14. The method of claim 11 including the step of tracking data relating to the call originally received at the originating ACD in response to receipt at the destination ACD to the identification of the originating ACD in the data received from the originating ACD.

15. The method of claim 11 including the step of determining a total delay time of the call in the call distribution network in response to the receipt of the delay time of the overflow call in a queue at the originating ACD in the data received from the originating ACD.

16. The method of claim 11 including the step of sending information to an internal telephonic unit at the destination ACD relating to the identified type of overflow call received at the destination ACD in response to receipt at the destination ACD of the ANI number representation in the data sent from the originating ACD.

17. The method of claim 11 including the step of placing the overflow call in a queue at the destination ACD in accordance with the assigned priority level of the call in response to receipt at the destination ACD of the priority level of the overflow call in the data sent from the originating ACD.

18. The method of claim 11 including the step of transferring the overflow call from the originating ACD to another ACD.

* * * * *